Jan. 29, 1952 W. R. HEWLETT 2,583,649
MODIFIED WIEN-BRIDGE OSCILLATOR
Filed Jan. 27, 1947 2 SHEETS—SHEET 1

INVENTOR.
William R. Hewlett
BY Paul D. Flehr
ATTORNEY

INVENTOR.
William R. Hewlett
BY Paul D. Flehr
ATTORNEY

Patented Jan. 29, 1952

2,583,649

UNITED STATES PATENT OFFICE 2,583,649

MODIFIED WIEN-BRIDGE OSCILLATOR

William R. Hewlett, Palo Alto, Calif., assignor, by mesne assignments, to Hewlett-Packard Company, Palo Alto, Calif., a corporation of California Application January 27, 1947, Serial No. 724,603

3 Claims. (Cl. 250—36)

This invention relates generally to variable frequency oscillation generators and particularly to generators which are relatively stable as to the selected frequency of operation.

In my Patent 2,268,872 there is disclosed an oscillation generator which can be adjusted over a wide range of operating frequencies and which has a relatively high degree of frequency stability. In its preferred form the generator of my patent consists of a two stage resistance coupled amplifier to which both positive and negative feedback are applied. Positive feedback is provided by a network which serves to control the frequency of operation and which consists of a selective resistance-capacitance combination. The negative feedback employs a non-linear element such as a suitable ballast lamp, and serves to control the amount of negative feedback responsive to variations in the amplitude of oscillations. In practice at least two condensers of the positive feedback network are made variable, and the resistors are made adjustable whereby combinations can be had affording a range of frequency operation of from say 6 c. p. s. (cycles per second) to 600 kilocycles per second. In certain instances it is desirable to extend the frequency range of operation to higher frequencies, and also for some purposes it is desirable to extend the lower frequency limit. One form of apparatus enabling such an extension of the frequency range is disclosed in my copending application No. 721,219, filed January 10, 1947. In that instance the extension is made possible by a novel type of feedback network utilizing two variable condensers for securing the desired range of operation.

It is an object of the present invention to provide another form of oscillation generator which will provide an extended frequency range of operation, and which makes use of relatively fixed condensers or capacitance elements, together with resistors which are variable for adjusting the frequency of operation.

Further objects of the invention will appear from the following description in which the preferred embodiments have been set forth in detail in conjunction with the accompanying drawing.

Referring to the drawing.

Figure 1:
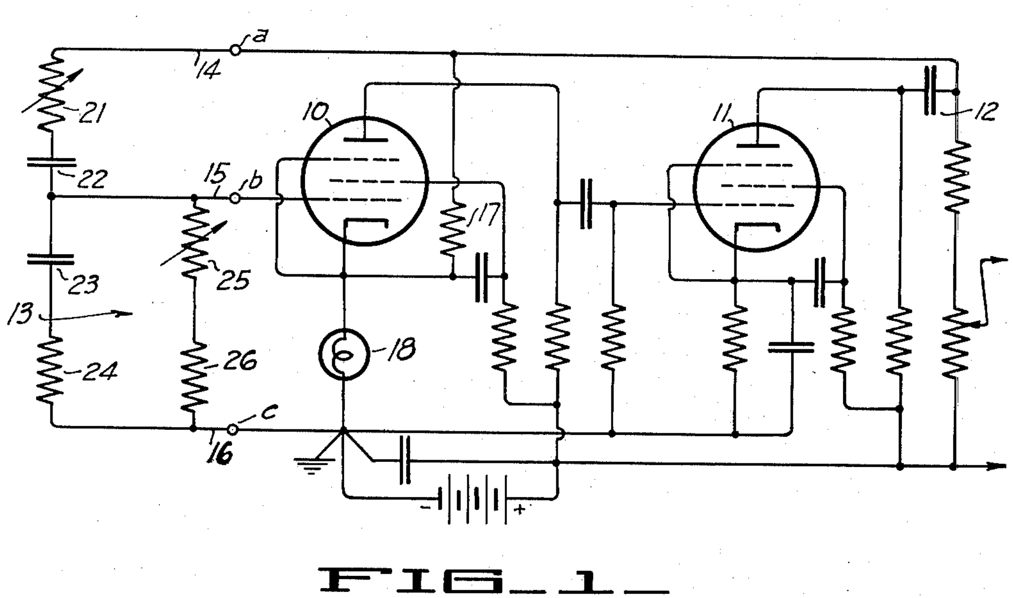
Figure 1 is a circuit diagram illustrating one embodiment of the invention.

Referring first to the embodiment of the invention illustrated in Figure 1, I have shown an oscillation generator similar to that disclosed in my Patent 2,268,872, and which consists of the vacuum tube amplifiers 10 and 11 coupled together by resistance elements in a manner well known to those skilled in the art. In practice tube 10 can be of the type known by manufacturers' specifications as No. 6J7, and tube 11 as number 6F6. The plate of tube 10 is coupled to the control grid of tube 11, and the plate of tube 11 is coupled through a condenser 12, with a selective network designated generally at 13. The three points of connection *a*, *b* and *c* between the network 13 and the other parts of the oscillation generator represent respectively a point on the conductor 14 which leads to the coupling condenser 12, a point on conductor 15 which leads to the control grid of tube 10, and a point on the conductor 16 which is grounded and connected to the cathodes and the negative side of the plate current source. Thus conductor 16 in effect is connected to a point of neutral potential. As will be presently explained network 13 includes resistance and capacity elements connected in combination in such a fashion as to permit positive feedback to maintain oscillations in the system, and to provide a desired frequency of operation.

In order to stabilize operation of the generator a negative feedback is supplied by a linear resistance 17 connected between the cathode of the tube 10 and conductor 14, and a non-linear resistance 18 in the form of a small incandescent lamp or like ballast element. The lamp is connected between the cathode of tube 10 and grounded conductor 16. When potential differences exist between points *a* and *c* current flow occurs through 17 and 18 to afford a negative feedback, and the amount of such negative feedback can be adjusted by changing the value of resistance 17, and is automatically adjusted by changing resistance of the non-linear element 18. As disclosed in said Patent 2,268,872 such an arrangement serves to control the amplitude of oscillation and to stabilize and maintain constant the frequency of operation of the apparatus. In addition to or in place of, providing a nonlinear resistance 18 of the type described the resistor 17 can be nonlinear and of the type whose resistance decreases with increase in current. Such resistors are available on the market under the trade name of "thermistor."

The network 13 of Figure 1 consists of one circuit formed by the variable resistor 21 and the relatively fixed condenser 22, which are serially connected between the conductors 14 and 15. Another circuit of the network is formed by the relatively fixed condenser 23, resistor 24, variable resistor 25, and relatively fixed resistor 26. Condenser 23 and resistor 24 are serially connected between conductors 15 and 16, and variable resistor 25 and resistor 26 are likewise serially connected between the same conductors.

Figure 2:
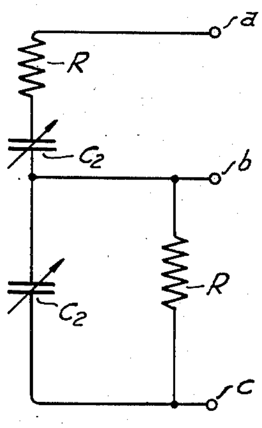
Figure 2 is a circuit diagram illustrating a selective network of the type disclosed in Patent 2,268,872.

Explanation of the network 13 of Figure 1 can best be understood after reviewing the network illustrated in Figure 2, which corresponds to that illustrated in Figure 1 of my Patent 2,268,872. Using the symbols appearing in this view the frequency of operation can be expressed by an equation as follows:

Equation 1 $$f=\frac{1}{2\pi RC_2}$$

The above assumes that the two resistors are of the same value, and that the condensers have the same range of variation and are adjusted simultaneously as by use of a gang control. It is evident from Equation 1 that as the value of each of the two condensers is decreased the frequency of operation is increased. In a typical example where the two resistors each have a value of 1 megohm, and the two condensers provide a capacitance range from 500 mmfd. to 50 mmfd., the frequency of operation can vary from 318 c. p. s. (cycles per second) to 3180 c. p. s. With this type of network there is a practical limit to the maximum frequency of operation. While the frequency of operation of Figure 2 can likewise be changed by adjusting the values of the resistance elements R, here again there is a practical limit to the maximum permissible frequency of operation. In general by varying the values of R, while maintaining $C_2$ constant, the frequency of operation cannot be effectively varied over a range greater than from 6 c. p. s. to 600 kilocycles.

Figure 3:
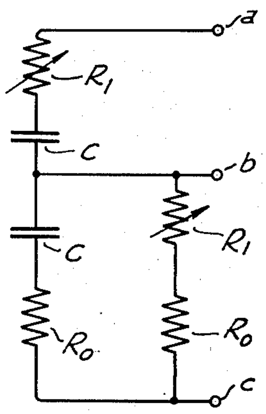
Figure 3 is a circuit diagram illustrating the selective network incorporated in Figure 1, but with the various resistance and capacity elements designated by symbols to facilitate a mathematical explanation.

The arrangement of Figure 1 permits an extension of the upper frequency limit beyond that possible with the arrangement of Figure 2. In Figure 3 the network 13 of Figure 1 has been repeated and the various resistors and condensers have been given symbols. The assumption is made that the resistors $R_1$ have the same range of adjustment and for a given setting are adjusted to the same values. Also it is assumed that condensers 22 and 23 are of the same value, and that the resistors 24, 26 are of like value. The frequency of operation of this network can be expressed by an equation as follows:

Equation 2 $$f=\frac{1}{2\pi R_1C}\cdot\frac{1}{\sqrt{1-2\left(\frac{R_0}{R_1}\right)^2}}$$

It is evident from the above equation that use of the two variable resistors 21, 25 together with a fixed resistor 26, makes possible a substantial extension of the higher frequency limit, while at the same time permitting frequencies of operation down to lower limits the same as in Figure 2. Assuming for example that the resistors 21, 25 have a permissible adjustment from 10,000 ohms to 100,000 ohms, that condensers 22 and 23 have a capacitance of 5,000 mmfd., and that resistors 24 and 26 each have a value of 6,667 ohms, the frequency range according to Equation 2 is from 318 c. p. s. to 9540 c. p. s. This increased frequency is obtained without sacrificing stability of operation for a given adjustment.

Figures 4, 5, 6:
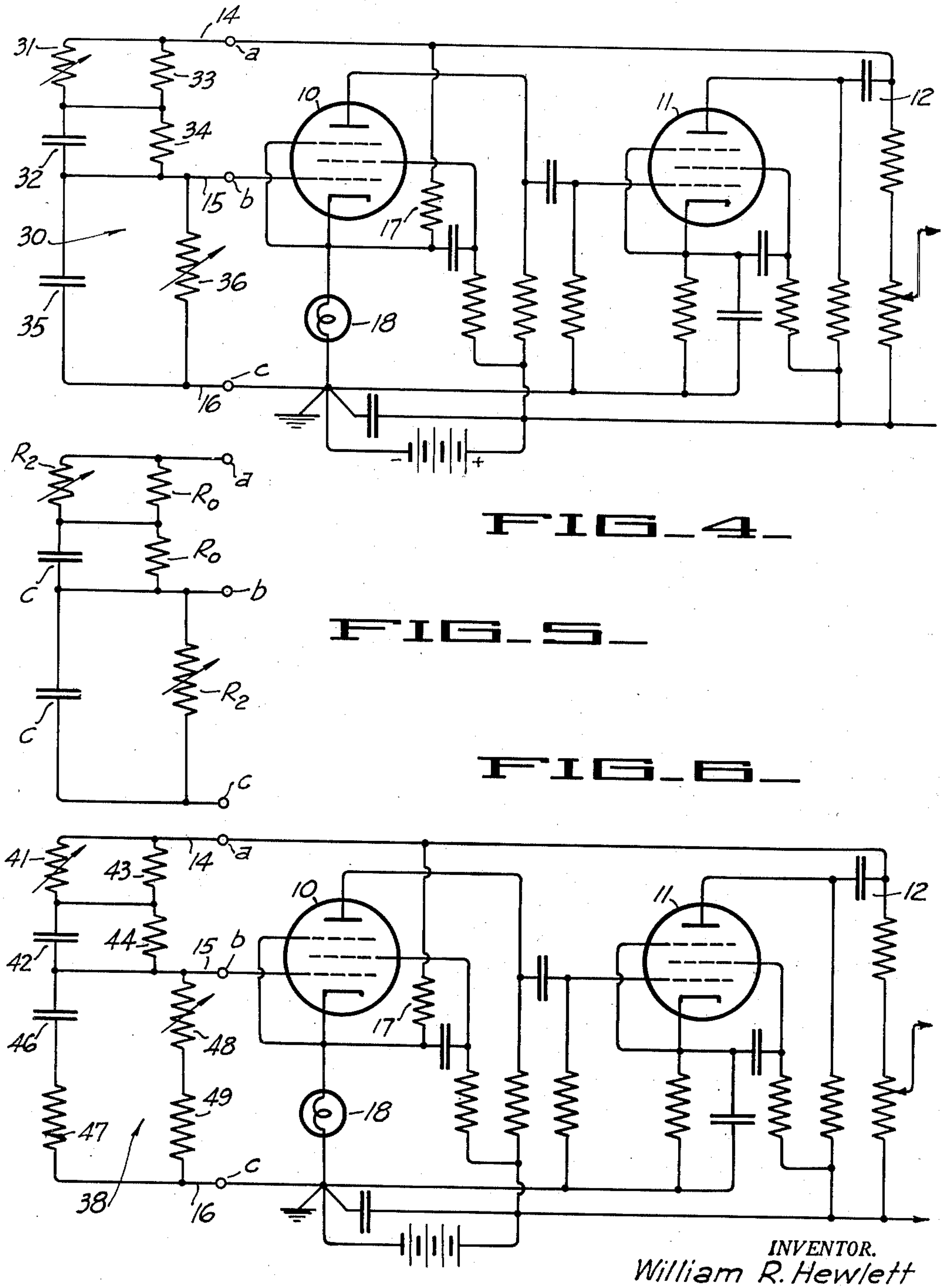
Figure 4 is a circuit diagram similar to Figure 1 but showing another embodiment of the invention.
Figure 5 is a circuit diagram illustrating the selective network utilized in Figure 4, but with symbols applied to the resistance and capacity elements to facilitate a mathematical explanation.
Figure 6 is a circuit diagram similar to Figure 1 but illustrating another embodiment of the invention.

The embodiment of Figure 4 is desirable in instances where it is desirable to extend the lower frequency limit beyond the values feasible with the network of Fig. 2. In this instance the selective resistance-capacity network is designated generally at 30, and includes a circuit consisting of variable resistor 31, and relatively fixed condenser 32, together with the resistors 33, 34. Resistor 31 and condenser 32 are connected in series between conductors 14 and 15, and resistors 33, 34 are likewise shunted respectively across resistor 31 and condenser 32. The second circuit of the network consists of a condenser 35 which is connected between conductors 15 and 16, together with the shunt variable resistor 36.

Figure 5 illustrates the same network 30 with symbols applied to the various resistance and capacity elements. It is assumed that resistors 31 and 36 have the same range of adjustment and that for a given adjustment they have the same resistance value. Also it is assumed that resistors 33 and 34 are of the same value, and that condensers 32 and 35 are of like value. The frequency of operation of such a network can be represented by an equation as follows:

Equation 3 $$f=\frac{1}{2\pi R_2C}\sqrt{1-2\left(\frac{R_2}{R_0}\right)^2}$$

Assuming for example that $R_2$ represents a resistance value which by adjustment of resistors 31, 36 may range from 10,000 ohms to 100,000 ohms, $R_0$ a value of 150,000 ohms, and C a value of 5000 mmfd., then the operating frequency varies from 106 c. p. s. to 3180 c. p. s., depending upon the setting of the resistors 31, 36. The arrangement of Figure 4 can therefore be utilized to enable a substantial extension of the lower frequency limit, while at the same time permitting frequencies to the same upper limit as for Figure 2.

In the embodiment of Figure 6 the selective resistance capacity network 38 combines the features of both Figures 1 and 4, whereby both the low and high frequency limits are substantially extended. The network 38 in this instance includes one circuit formed by variable resistor 41, condenser 42, and relatively fixed resistors 43, 44. Variable resistor 41 and condenser 42 are connected in series between conductors 14 and 15. Resistors 43 and 44 are shunted respectively across resistor 41 and condenser 42. The other circuit of the network 38 is formed by condenser 46, resistor 47, variable resistor 48, and resistor 49. Condenser 46 and resistor 47 are connected in series between conductor 15 and 16. Variable resistor 48 and resistor 49 are likewise connected in series between the same conductors. Assuming an example to provide a comparison with the preceding embodiments, variable resistors 41 and 48 can have a range of adjustment from 100,000 ohms to 10,000 ohms, and for a given adjustment they can be of the same value. Condensers 42 and 46 can have a value of 5000 mmfd., resistors 43 and 44 a value of 150,000 ohms, and resistors 47 and 49 a value of 6,667 ohms. For the full range of adjustment of resistors 41 and 48 the frequency of operation will be over a range of from 106 c. p. s. to 9540 c. p. s. Thus this embodiment provides an extension of both the high and low frequency limits as compared to the network of Figure 2. For the higher frequencies of the complete range of adjustment the network 38 of Figure 6 operates substantially the same as the network 13 of Figure 1, and its frequency of operation is determined generally according to Equation 2. For the relatively low frequencies the network operates substantially in the manner of the network 30 of Figure 4, and in accordance with Equation 3. Thus, for a resistance variable over a 10:1 range a frequency range of 90:1 can be obtained.

The preceding formulas have been derived on the basis of equal values of fixed condensers, of fixed resistors, and of variable resistors. The preceding modifications are not limited, however, to this condition but merely require that the product of the variable resistor and the fixed condenser between points *a* and *b* in Figure 1 and Figure 4 equal the product of the variable resistor and fixed condenser between the points *b* and *c*.

I claim:

1. A frequency determining network for forming a positive feedback from the output to the input of an oscillation generator of the type utilizing electronic amplifying means having an input control grid and an output plate circuit, said network comprising resistance and capacitance elements forming two circuits, one circuit being connected between two conductors, the first of said two conductors being coupled to the plate circuit and the second being connected to the control grid, the other circuit being connected between said second conductor and a third conductor which is connected to a point of neutral potential, the first circuit comprising a variable resistor and a fixed capacitance serially connected between the first and second conductors, the second circuit comprising a fixed condenser and a fixed resistance serially connected between the second and third conductors together with a variable resistance and a fixed resistance serially connected between the second and third conductors, said network affording a relatively wide frequency range of operation upon adjustment of said variable resistors, the frequency of operation for a substantial portion of said range being in accordance with the equation $$f=\frac{1}{2\pi R_1 C}\cdot\frac{1}{\sqrt{1-2\left(\frac{R_0}{R_1}\right)^2}}$$

wherein $R_1$ represents the adjusted value of each of the variable resistors, C represents the capacitance of each of the fixed condensers, $R_0$ represents the resistance of each of the two fixed resistors, and $f$ represents the frequency of operation.

2. A frequency determining network for forming a positive feedback from the output to the input of an oscillation generator of the type utilizing electronic amplifying means having an input control grid and an output plate circuit, said network comprising resistance and capacitance elements forming two circuits, one circuit being connected between two conductors, the first of said two conductors being coupled to the plate circuit and the second being connected to the control grid, the other circuit being connected between said second conductor and a third conductor, the third conductor being connected to a point of neutral potential, the first circuit comprising a variable resistor and a fixed condenser serially connected between the first and second conductors, together with a fixed resistor shunted across the variable resistor and another fixed resistor shunted across said condenser, the second circuit comprising two shunt connected paths, one path including a fixed condenser and the other a variable resistor, said network affording a relatively wide frequency range of operation for a substantial portion of said range being in accordance with the equation $$f=\frac{1}{2\pi R_2 C}\sqrt{1-2\left(\frac{R_2}{R_0}\right)^2}$$

where $R_2$ represents the adjusted value of each of the variable resistors, $R_0$ represents the value of each of the fixed resistors, C represents the value of each of the fixed condensers, and $f$ represents the frequency of operation.

3. A frequency determining network for forming a positive feedback from the output to the input of an oscillation generator of the type utilizing electronic amplifying means having an input control grid and an output plate circuit, said network comprising resistance and capacitance elements forming two circuits, one circuit being connected between two conductors, the first of said two conductors being coupled to the plate circuit and the second being connected to the control grid, the other circuit being connected between said second conductor and a third conductor which is connected to a point of neutral potential, the first circuit comprising a variable resistor and a fixed condenser serially connected between the first and second conductors, together with a fixed resistor shunted across the variable resistor and another fixed resistor shunted across said condenser, the second circuit comprising a fixed condenser and a fixed resistance serially connected between the second and third conductors together with a variable resistance and a fixed resistance serially connected between the second and third conductors, said network affording a relatively wide range of operation upon adjustment of said variable resistors, the frequency of operation for the higher portion of said range being in accordance with the equation $$f=\frac{1}{2\pi R_1 C}\cdot\frac{1}{\sqrt{1-2\left(\frac{R_0}{R_1}\right)^2}}$$

where $R_1$ represents the adjusted value of each of the variable resistors, C represents the capacitance of each of the fixed condensers, $R_0$ represents the resistance of each of the two fixed resistors which are included in the second circuit, and $f$ represents the frequency of operation, the frequency of operation for the lower portion of said range being in accordance with the equation $$f=\frac{1}{2\pi R_2 C}\sqrt{1-2\left(\frac{R_2}{R_0}\right)^2}$$

where $R_2$ represents the adjusted value of the variable resistor in the first circuit and the adjusted value of the variable resistor in the second circuit, $R_0$ represents the value of each of the fixed resistors in the first circuit, C represents the value of each of the fixed condensers, and $f$ represents the frequency of operation.

WILLIAM R. HEWLETT.

REFERENCES CITED

The following references are of record in the file of this patent:

UNITED STATES PATENTS

| Number | Name | Date |
|---|---|---|
| 2,072,946 | Farnham | Mar. 9, 1937 |
| 2,093,665 | Tellegen | Sept. 21, 1937 |
| 2,268,872 | Hewlett | Jan. 6, 1942 |
| 2,298,177 | Scott | Oct. 6, 1942 |
| 2,354,141 | Purington | July 18, 1944 |
| 2,444,084 | Artzt | June 29, 1948 |
| 2,446,821 | Gassel et al. | Aug. 10, 1948 |

FOREIGN PATENTS

| Number | Country | Date |
|---|---|---|
| 524,124 | Great Britain | Aug. 2, 1940 |